US008521577B2

(12) United States Patent
Forstall et al.

(10) Patent No.: US 8,521,577 B2
(45) Date of Patent: Aug. 27, 2013

(54) METHOD AND SYSTEM FOR PARATRANSIT RUN-CUTTING

(75) Inventors: Keith W. Forstall, Lexington, MA (US); Jan Bednarz, Dernancourt (AU)

(73) Assignee: Trapeze Software, Inc., Mississauga, Ontario (CA)

( * ) Notice: Subject to any disclaimer, the term of this patent is extended or adjusted under 35 U.S.C. 154(b) by 0 days.

(21) Appl. No.: 13/074,906

(22) Filed: Mar. 29, 2011

(65) Prior Publication Data

US 2012/0253863 A1 Oct. 4, 2012

(51) Int. Cl.
*G06Q 10/00* (2012.01)

(52) U.S. Cl.
USPC .......................... 705/7.12; 705/7.11; 705/7.13

(58) Field of Classification Search
USPC ....................................... 705/7.11, 7.12, 7.13
See application file for complete search history.

(56) References Cited

U.S. PATENT DOCUMENTS

| | | | | |
|---|---|---|---|---|
| 5,799,263 | A * | 8/1998 | Culbertson | 701/117 |
| 6,356,838 | B1 * | 3/2002 | Paul | 701/410 |
| 6,754,634 | B1 * | 6/2004 | Ho | 705/6 |
| 7,624,024 | B2 * | 11/2009 | Levis et al. | 705/1.1 |
| 2002/0055818 | A1 * | 5/2002 | Gaspard, II | 701/209 |
| 2004/0133411 | A1 * | 7/2004 | Babb | 703/22 |
| 2008/0027772 | A1 * | 1/2008 | Gernega et al. | 705/7 |
| 2010/0094533 | A1 * | 4/2010 | Wu | 701/200 |

* cited by examiner

*Primary Examiner* — Thomas Dixon
*Assistant Examiner* — Gerald Vizvary
(74) *Attorney, Agent, or Firm* — Sanford Astor; Brooks Kushman P.C.

(57) ABSTRACT

A method and system for paratransit run-cutting is provided. A target number of paratransit vehicles is determined for each of a set of time intervals. A target number of trips corresponding to the target number of paratransit vehicles is generated for each time interval, each of said mock trips being defined such that a vehicle performing one of said mock trips in one of said time intervals is able to perform any of said mock trips in an immediately subsequent one of said time intervals. The target number of mock trips for each of the time intervals is entered into a fixed-route transit run-cutting application. Paratransit runs are created using fixed-route transit runs generated by said fixed-route transit run-cutting application.

22 Claims, 9 Drawing Sheets

Demand Profile: Wednesdays
From Jan 1 2009 to March 31 2009

| Date | Percentile | Trips | Percentile |
|---|---|---|---|
| 1/28/2009 | | 1926 | |
| 3/25/2009 | | 1966 | |
| 1/21/2009 | 25% | 1989 | |
| 1/7/2009 | | 2051 | 25% |
| 3/18/2009 | | 2064 | |
| 3/4/2009 | 50% | 2069 | |
| 1/14/2009 | | 2071 | |
| 3/11/2009 | | 2122 | |
| 2/18/2009 | 75% | 2165 | |
| 2/11/2009 | | 2197 | |
| 2/4/2009 | | 2354 | 50% |
| 2/25/2009 | 100% | 2697 | 100% |

Median: 2015

Figure 5

<trip><depdate>01/01/2010<deptime>00:00<deploc>43.664775,-
79.322566<arrdate>01/01/2010<arrtime>00:30<arrloc>43.664775,-79.322566</trip>
<trip><depdate>01/01/2010<deptime>00:00<deploc>43.664775,-
79.322566<arrdate>01/01/2010<arrtime>00:30<arrloc>43.664775,-79.322566</trip>
<trip><depdate>01/01/2010<deptime>00:00<deploc>43.664775,-
79.322566<arrdate>01/01/2010<arrtime>00:30<arrloc>43.664775,-79.322566</trip>
<trip><depdate>01/01/2010<deptime>00:00<deploc>43.664775,-
79.322566<arrdate>01/01/2010<arrtime>00:30<arrloc>43.664775,-79.322566</trip>
<trip><depdate>01/01/2010<deptime>00:00<deploc>43.664775,-
79.322566<arrdate>01/01/2010<arrtime>00:30<arrloc>43.664775,-79.322566</trip>
<trip><depdate>01/01/2010<deptime>00:00<deploc>43.664775,-
79.322566<arrdate>01/01/2010<arrtime>00:30<arrloc>43.664775,-79.322566</trip>
<trip><depdate>01/01/2010<deptime>00:00<deploc>43.664775,-
79.322566<arrdate>01/01/2010<arrtime>00:30<arrloc>43.664775,-79.322566</trip>

.
.
.
.

<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>
<trip><depdate>01/07/2010<deptime>23:30<deploc>43.664775,-
79.322566<arrdate>01/08/2010<arrtime>00:00<arrloc>43.664775,-79.322566</trip>

Figure 9

METHOD AND SYSTEM FOR PARATRANSIT RUN-CUTTING

FIELD OF THE INVENTION

The present invention relates generally to paratransit. More particularly, the present invention relates to a method and system for paratransit run-cutting.

BACKGROUND OF THE INVENTION

Traditional public transit provisioning is known. A set of fixed routes is established for a metropolitan area being served. For each fixed route, there is a physical route being traveled by public transit vehicles, including the scheduled stops along the physical route, as well as a time schedule for when a transit vehicle is expected to be at a particular scheduled stop. The fixed routes are established based on the population distribution and the street layout of the metropolitan area, as well as the perceived demand for service for that population. In addition, schedules are set up for vehicle trips along each fixed route. Trips typically travel along the full length of a fixed route. In some cases, however, a trip—referred to as a short turn—is scheduled to only travel along a segment of the fixed route. The trips are well-established to enable the transit provider to plan travel and to plan the manpower and vehicles required.

Once all of the trips have been defined, they are entered into a fixed-route transit run-cutting application. The run-cutting application has access to a set of rules and parameters for generating vehicle runs (i.e., vehicle assignments from pull-out from a depot to pull-in) and driver shifts and rosters. Rosters are biddable/assignable pieces of work representing an appropriate number of hours of work over a one or two week period. These rules and parameters correspond to the minimum and maximum lengths for driver shifts, the maximum spread time for split driver shifts, etc. The run-cutting application analyzes all of the trips and generates vehicle runs and driver shifts and rosters. In doing so, it takes into consideration the rules for generating vehicle runs and driver shifts and rosters, and timing information for a vehicle and driver to travel between the termination point of a trip on one fixed route to the origin point of another trip on the same or a different fixed route.

Paratransit, or dial-a-ride, is an alternative mode of flexible on-demand passenger transportation that does not follow fixed routes or schedules. Typically vans or mini-buses are used to provide paratransit service, but shared ride taxis and jitneys can also be used. Paratransit services operated by public transit organizations are often fully demand-responsive transport, wherein on-demand call-up curb-to-curb or door-to-door service from any origin to any destination in a service area is offered. Such services are typically provided to serve people in the metropolitan area that have a disability affecting their ability to use fixed-route transit, who are provided transportation services in accordance with a public or non-profit social service program of some type, etc. Trips in paratransit are scheduled as needed to meet the needs of individuals. Such passenger trips generally correspond to tasks like “Pick up Mr. Jones from his house at 123 Main Street at 3 pm and drive him to city hall”.

While, with fixed-route transit, a level of service is determined to meet the needs of the majority of the people using the service, the goals differ for the level of service provided to paratransit users. It is generally desirable to ensure that users requesting service receive service because their options are more limited. If paratransit service is not made available to some users, strong penalties may be imposed on the transit organization by the government, and the transit organization’s public image may be negatively impacted.

In contrast to the method of run-cutting in fixed-route transit, paratransit vehicle runs and driver shifts and rosters are typically generated manually. Even though most paratransit service providers also operate fixed-route service, the manner in which trips are defined and scheduled for paratransit service does not make them readily enterable into a fixed-route transit run-cutting application. As passenger trips may be scheduled at any time, including shortly before the departure time, the passenger trip data generally is not available early enough to plan service requirements. As a result, paratransit service providers typically plan service by projecting how much demand there will be to determine how much service will be required, and then manually generating a run-cut. This process is labor-intensive and prone to human error.

It is therefore an object of the invention to provide a novel method and system for paratransit run-cutting.

SUMMARY OF THE INVENTION

According to an aspect of the invention, there is provided a method for paratransit run-cutting, comprising:

determining a target number of paratransit vehicles for each of a set of time intervals;

generating, for each of said time intervals, a target number of mock trips corresponding to said target number of paratransit vehicles, each of said mock trips being defined such that a vehicle performing one of said mock trips in one of said time intervals is able to perform any of said mock trips in an immediately subsequent one of said time intervals;

entering said target number of mock trips for each of said time intervals into a fixed-route transit run-cutting application; and creating paratransit runs using a run-cut generated by said fixed-route transit run-cutting application.

The time intervals can be all of a standard length between 15 minutes and one hour.

The start and end points of the mock trips can be at the same location.

According to another aspect of the invention, there is provided a system for paratransit run-cutting, comprising:

storage;

input data stored in said storage, said input data comprising a target number of mock trips for each of a set of time intervals, said target number of mock trips representing a target number of paratransit vehicles for each of said time intervals, each of said mock trips being defined such that a vehicle performing one of said mock trips in one of said time intervals is able to perform any of said mock trips in an immediately subsequent one of said time intervals; and a fixed-route transit run-cutting application stored in said storage, said fixed-route transit run-cutting application being operable, when executed, to receive said input data stored in said storage and generate a run-cut corresponding to said input data.

The time intervals can all be a standard length between 15 minutes and one hour.

The mock trips can start and/or end at the same location.

According to a further aspect of the invention, there is provided a method for run-cutting, comprising:

receiving input data comprising a target number of mock trips for each of a set of time intervals, said target number of mock trips representing a target number of paratransit vehicles for each of said time intervals, each of said mock trips being defined such that a vehicle performing one of said mock trips in one of said time intervals is able to perform any of said mock trips in an immediately subsequent one of said time intervals;

executing a fixed-route transit run-cutting application using said input data to generate a run-cut; and outputting said run-cut.

The time intervals can be all of a standard length between 15 minutes and one hour.

The trips can start and/or end at the same location.

The input data can be stored in a file stored in storage.

The input data can be received via network communication.

According to yet another aspect of the invention, there is provided a system for run-cutting, comprising:

input data stored in storage of a computer system, said input data comprising a target number of mock trips for each of a set of time intervals, said target number of mock trips representing a target number of paratransit vehicles for each of said time intervals, each of said mock trips being defined such that a vehicle performing one of said mock trips in one of said time intervals is able to perform any of said mock trips in an immediately subsequent one of said time intervals, said input data formatted for use with a fixed-route transit run-cutting application for generating a run-cut.

The time intervals can be all of a standard length between 15 minutes and one hour.

The mock trips can start and/or end at the same location.

BRIEF DESCRIPTION OF THE DRAWINGS

Embodiments will now be described, by way of example only, with reference to the attached Figures, wherein:

FIG. 5 is a table of the total trips for the Wednesdays shown in FIG. 4 after reordering;

FIG. 9 shows exemplary input data generated by the computer system of FIG. 1 for providing to a fixed-route transit run-cutting application.

DETAILED DESCRIPTION OF THE EMBODIMENTS

Figure 1:
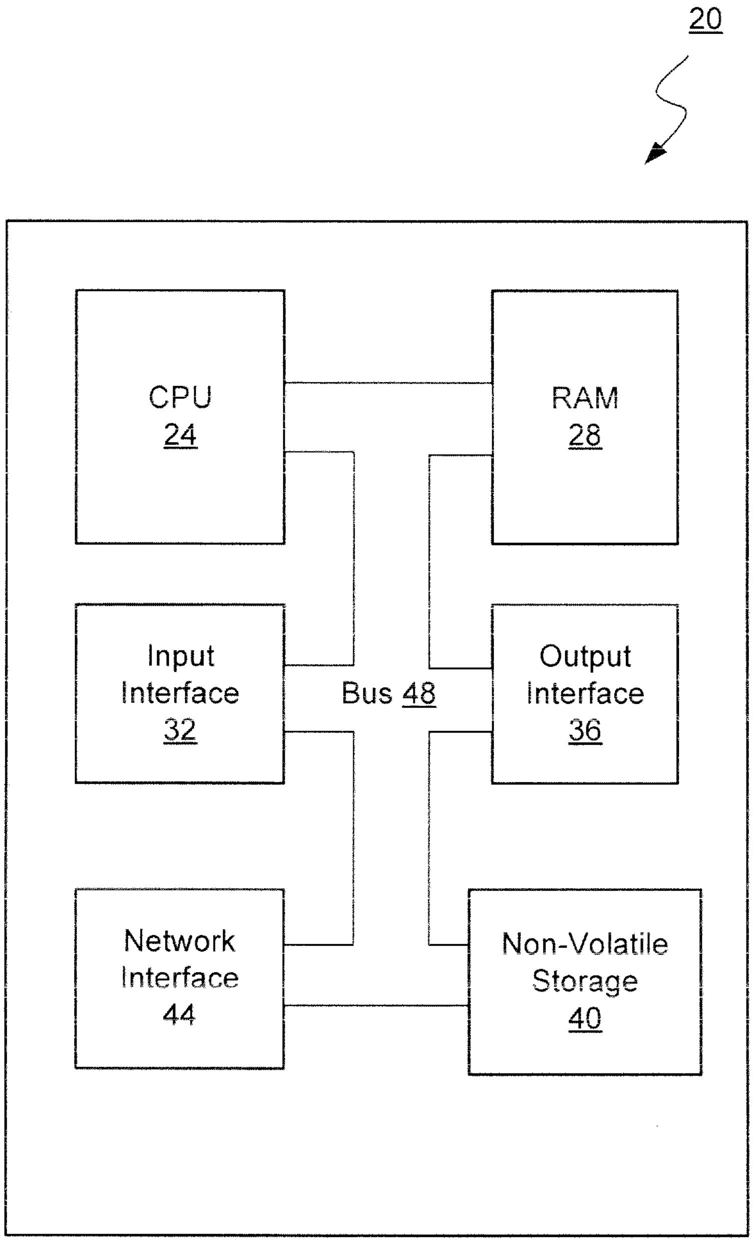
FIG. 1 shows a schematic representation of a computer system for paratransit run-cutting in accordance with an embodiment of the invention.

Paratransit service scheduling is markedly different than for fixed-route transit. In fixed-route transit, a number of fixed routes are established and the type of vehicle that travels a particular fixed route is generally not varied. The scheduled frequency of service along the fixed route is reduced to decrease costs for periods of lower demand. During most of the time, however, the frequency of service provided results in few vehicles being filled to their capacity, which can include standing passengers. As a result, fixed-route service can readily handle unexpected fluctuations in passenger volume.

In contrast, in paratransit, vehicles are typically smaller, enabling them to carry fewer passengers and requiring seatbelts for all riders. Further, as paratransit involves picking up and dropping off passengers along varying routes, vehicles providing paratransit service cannot handle additional passengers as readily as fixed-route transit can.

While it may be acceptable to not have planned fixed-route service that can handle the requirements of a particular passenger, the very nature of paratransit leads to a high desirability to meet demand in almost every case. In some cases excess demand can be shifted to other transportation providers, such as taxis. As the majority of the cost of other such transportation is traditionally picked up by the paratransit service providers, and as such costs may be significantly higher than providing such service within the paratransit organizations, however, it is desirable to minimize the amount of passengers shifted to other transportation providers. As a result, in order to have a better chance of serving fluctuations, paratransit service providers typically err on the side of over-provisioning the number of vehicles/operators.

As a result of the ad-hoc nature of paratransit service demand, which makes driver and vehicle requirement planning based on scheduled passenger trips unsuitable due to the required lead-time for scheduling drivers and vehicles, paratransit service providers generally schedule driver and vehicle requirements based on historical demand. Further, due to the desirability of satisfying most, if not all, demand, paratransit service is often over-provisioned to ensure that all demand is met almost all of the time.

Demand for paratransit service can vary markedly during the course of a day and have different patterns than for fixed-route transit service. Certain weekdays can be busier than other weekdays. Demand patterns during the course of each day can fluctuate for paratransit in a different manner than for fixed-route transit. In an effort to better match resources to demand to reduce the amount of over-provisioning, paratransit service providers generally project demand by time interval (typically, 15 or 30 minutes) of the day. Translating these projected demand levels into driver and vehicle schedules is challenging, however, as it is typically done by hand at present.

Fixed-route transit run-cutting applications generate run-cuts, given a set of scheduled trips and a set of rules and parameters for vehicle runs and driver shifts and rosters (i.e., work schedules for drivers that include a number of shifts). The input data for each of the scheduled trips in the set includes a point and time of departure, a destination, and a scheduled time of arrival at the destination. Given ail of the scheduled trips, a fixed-route transit run-cutting application is able to design vehicle runs and driver shifts and rosters to cover the scheduled trips. In some cases, some trips are "return" trips, in that they follow the same general route of a previous scheduled trip, departing immediately or shortly after the arrival at the destination of the earlier trip and traveling back to the point of departure of the earlier trip. The fixed-route transit run-cutting application recognizes that the driver and vehicle pair that is assigned to the first trip may be well-suited to perform the return trip, given that they will be at the right location at the right lime to commence the return trip. In other cases, a return trip is not scheduled and the fixed-route transit run-cutting application may try to determine if it makes sense for the driver and vehicle to "deadhead" (i.e., travel without passengers) to another location to commence a subsequent trip elsewhere, with the fixed-route transit run-cutting application taking into consideration locations and travel times. As one can imagine, there are various scenarios considered by the fixed-route transit run-cutting application when generating a run-cut.

In contrast, trips in the paratransit milieu refer to passenger pick-up and drop-offs. As passenger trips are generally not scheduled with enough lead-time to plan service, these trips are not used to generate nm-cuts.

The inventive method and system for paratransit run-cutting disclosed herein enables the use of a fixed-transit transit run-cutting application to run-cut paratransit service; that is, generate vehicle runs and driver shifts and rosters, given the projected demand to satisfy for each time interval. This is achieved by generating input data of a target number of mock trips, wherein each of the mock trips is defined such that a vehicle performing one of the mock trips in one of the time intervals is able to perform any of the mock trips in an immediately subsequent one of the time intervals. The target number of mock trips correspond to the target number of paratransit vehicles required to be in service for each time interval. The input data is then entered into a fixed-route transit run-cutting application in a manner that enables the run-cutting application to solve the problem as if it were a fixed-route problem. In turn, the fixed-route transit run-cutting application generates a run-cut for the input data. This run-cut is then used to create paratransit runs.

By creating a target number of mock trips corresponding to the target number of paratransit vehicles for each time interval wherein each of the mock trips is defined such that a vehicle performing one of the mock trips in one of the time intervals is able to perform any of the mock trips in an immediately subsequent one of the time intervals, a fixed-route transit run-cutting application can generate a run-cut that covers the project demand with as little over-provisioning as possible while satisfying the various requirements for vehicle runs and driver shifts and rosters.

FIG. 1 shows a computer system 20 for scheduling paratransit service in accordance with an embodiment of the invention. As shown, the computer system 20 has a number of components, including a central processing unit ("CPU") 24, random access memory ("RAM") 28, an input interface 32, an output interface 36, non-volatile storage 40, a network interface 44 and a local bus 48 enabling the CPU 24 to communicate with the other components. The CPU 24 executes an operating system and computer-executable instructions in the form of software that implements the method as will be described. RAM 28 provides relatively responsive volatile storage to the CPU 24. The input interface 32 allows for input to be received from one or more devices, such as a keyboard, a mouse, etc. The output interface 36 enables the CPU 24 to present output to a user via a monitor, a speaker, etc. Non-volatile storage 40 stores the operating system and the aforementioned computer-readable instructions, as well as data used by both. The network interface 44 permits communication with other systems. During operation of the computer system 20, the operating system and the computer-readable instructions may be retrieved from the non-volatile storage 40 and placed in RAM 28 to facilitate execution.

The computer system 20 stores and executes a demand analysis application for analyzing historical paratransit data to generate a target number of paratransit vehicles to be in service by time interval, typically 15 or 30 minutes in length. The demand analysis application uses the historical paratransit data and projects demand for paratransit service by time interval. In particular, the demand analysis application projects demand for each day in a period for which service is being scheduled by identifying a set of past days matching the day type of the day for which service is being planned, retrieving demand metrics for the set of past days, and mapping a target demand level to be satisfied onto the demand metrics for the set of past days. The user selects one of the past days generally corresponding to the target demand level and having a demand distribution representative of the general pattern of demand distribution for the set of past days. The demand analysis application initializes the number of vehicles for each time interval for the particular day based on the actual service provided for the selected past day and adjusts it based on mismatches between the actual service provided and the demand experienced on the selected past day, as measured by the service fit metrics. The result is the target number of vehicles for each time interval for the particular past day. This process is repeated for each day in the period for which service is being planned. As will be understood, some smoothing may be performed between days. Further, days may be deemed to commence/end after midnight in the middle of the night, as this may represent a more convenient dividing point.

Using the projected demand, the demand analysis application assists the user in identifying a target level of demand to be satisfied. The target level is selected based on user-configured parameters that will be discussed further below. The demand analysis application is an application that provides a web-based user interface allowing the user to set parameters and constraints and edit the run-cut inputs interactively as necessary. The demand analysis application generates input data and stores it in non-volatile storage 40.

Additionally, the computer system 20 also stores and executes a fixed-route transit run-cutting application. The fixed-route transit run-cutting application reads input data for vehicle requirements represented as mock fixed-route trips in a manner that enables the run-cutting application to solve the problem as if it were a fixed-route problem, and generates a run-cut that is deemed to best fit the target number of vehicles for each time interval in order to reduce the amount of over-provisioning. The run-cut observes certain vehicle run and driver shift constraints such as maximum percent split driver shifts and maximum spread time per driver shift. Runs are vehicle assignments from depot pull-out to pull-in. Driver shifts are periods worked by drivers and generally consist of one or more runs on a given day. The fixed-route transit run-cutting application assembles the driver shifts into rosters, or biddable/assignable pieces of work representing an appropriate number of hours of work over a one or two week period, and outputs them to non-volatile storage 40.

The historical paratransit data includes demand and service metrics collected by the paratransit service provider for a plurality of past days. The demand metrics include the number of customer events (pick-ups and drop-offs) for each past day by time interval. The service metrics include the actual service provided for the past days as well as service fit metrics. The metrics for the actual service provided identify the number of vehicles for each vehicle type and drivers that were active for each time interval. The service fit metrics provide a measure of how much the actual service provided exceeded or fell short of demand. In particular, the service fit metrics include lateness metrics and slack metrics. The lateness metrics correspond to the number of late passenger pick-ups and/or drop-offs by time interval. The slack metrics measure the total number of times a vehicle was idle for more than x minutes for each time interval. Idle time is time in the schedule in excess of what is required for the driver to travel from point to point on the manifest and to board and unload passengers. The data for each past day is associated with the past day to enable filtering of the data by day or day type.

The user interface of the demand analysis application includes a logon screen for restricting access to authorized personnel. An options screen enables input of the following:

Historical Data Location:

This enables specification of the location of the historical paratransit data in non-volatile storage 40.

Analysis Date Range:

This section permits a user to select the historical period over which demand and service is analyzed. The range can be selected by specifying a range length, such as two years, or start and end dates for the range.

Exception Dates:

This enables selection of exception dates (holidays or other days that the user wishes to exclude due to extraordinary circumstances such as snow days when non-critical service is cancelled) to be excluded from the analysis.

Group all Weekdays Together:

A checkbox enables a user to group all weekdays together as the same day type. If checked, all weekdays are treated equally, with demand being estimated using all weekdays. By default, this box is unchecked, thus treating each weekday separately. As many paratransit service providers have patterns of usage that vary by weekday (Wednesdays are often busier than other weekdays, for example), it can be desirable to perform the analysis treating each day of the week separately.

Trip Categorization:

This is a set of checkboxes that allows inclusion of no-show trips, cancelled trips, and/or unscheduled trips in the demand analysis. Unscheduled trips are trips that cannot be satisfied and are therefore unscheduled. Although these trips may not be serviced, the requests can be recorded to enable measurement of unsatisfied demand. For unscheduled trips, the request time is used and the average trip length is used to project a time for the non-request end of each trip. Additional checkboxes enable the inclusion or exclusion of trips by subtype. This is useful if, for example, denied and refused trips are categorized by subtype. Further, the analysis can be limited to trips assigned to specific providers. This is useful both for complex sites as well as for sites that routinely outsource a portion of their demand to taxis. By selecting the appropriate checkboxes, the analysis can be performed exclusively on cancelled trips, if so desired. If a time-based pattern of cancellations can be observed, it can allow the scheduling of service not on the projected demand, but on the net demand after foreseeable cancellations have been factored in.

Growth Rate:

This field permits a user to specify an expected growth rate to adjust scheduled service by. As scheduled service is determined using historical paratransit data, the scheduled service is adjusted for growth to the day for which service is being scheduled. Setting the rate of growth to zero enables growth to be ignored, and setting growth to a negative value implies negative growth.

Target Demand Level:

The target demand level can be specified in a number of manners, such as a ratio of the lime for which all projected demand is to be satisfied, or via cost functions for specifying a cost for satisfied and unsatisfied demand. In this embodiment, the target demand level is set as a percentage of days for which all projected demand is to be satisfied.

In addition, the user interface of the demand analysis application also allows the user to specify the available service in terms such as the available capacity type configurations and the maximum concurrent number of runs that can be supplied of each capacity type.

A web-based launch screen permits the user to individually launch the demand analysis application and the fixed-route transit run-cutting application. A wizard approach can also be used to walk a user through the process of building vehicle runs and driver shifts and rosters. A further dialog allows the user to update a standard paratransit scheduling application with the vehicle runs and driver shift and roster information that is created by the fixed-route transit run-cutting application. This allows confirmation of the run-cutting application's results by scheduling the trips that were originally requested against the new run-cut.

Figure 2:
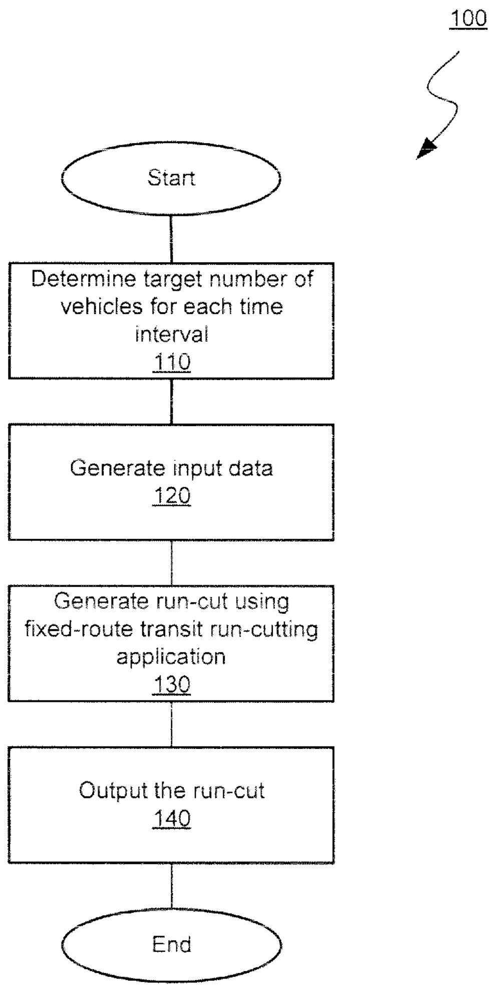
FIG. 2 is a flowchart of the general method for paratransit run-cutting using the computer system of FIG. 1.

The general method for paratransit run-cutting using the computer system 20 is shown generally at 100 in FIG. 2. The method 100 commences with the determination of the target number of vehicles for each time interval of the day for each day in the period for which service is being scheduled (step 110).

Figure 3:
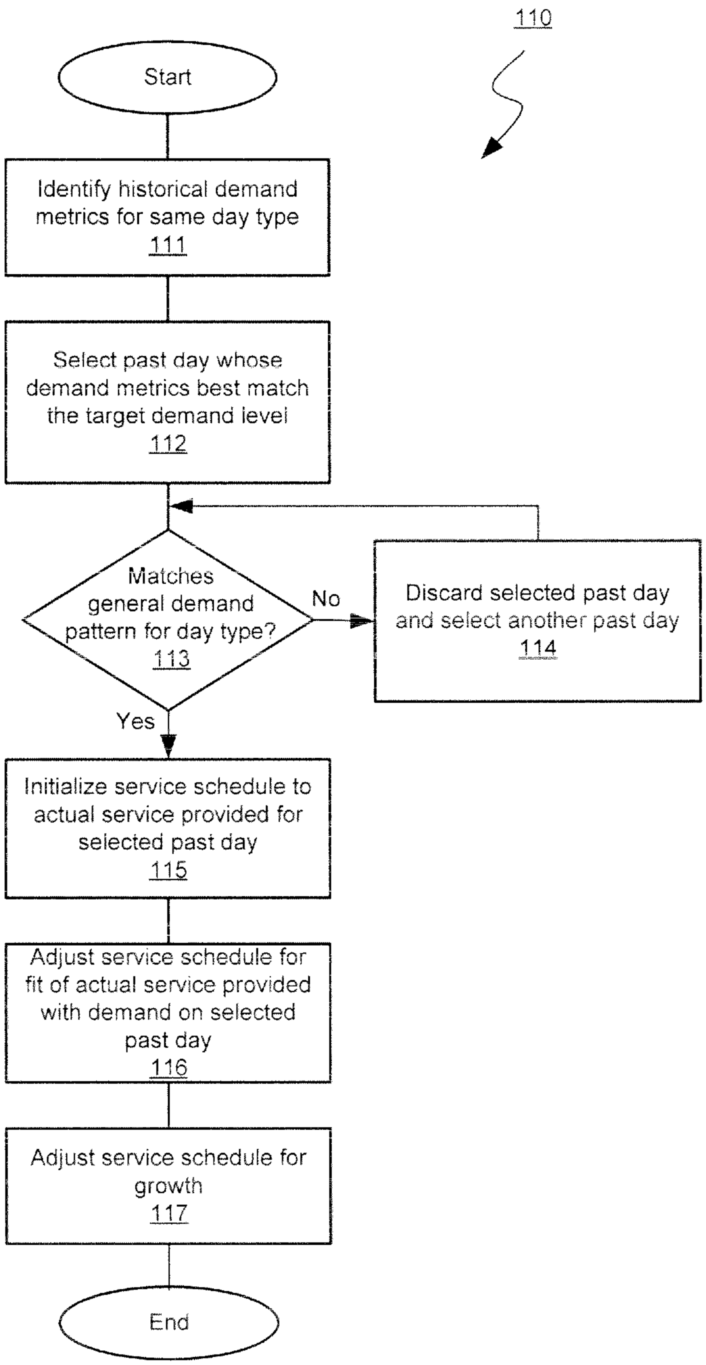
FIG. 3 is a flowchart of the determination of the target number of vehicles for each time interval.

FIG. 3 shows the process of determining the target number of vehicles for each time interval of a day in greater detail. The process commences with the identification of historical demand metrics for past days of the same day type as the day for which service is being planned (111). The demand analysis application identifies a set of past days matching the day type for which service is being scheduled. Exception dates are excluded from the set of past days. Selection of the date range over which to analyze demand is important to the success of the process. Paratransit is often seasonal in nature. Therefore, a good way to look at expected demand for a pending summer season, for example, can be to look at demand for the same period of time in the prior year. The demand metrics in the historical paratransit data for the identified set of past days include pick-up and drop-off events by time interval for each past day in the set.

Figure 4:
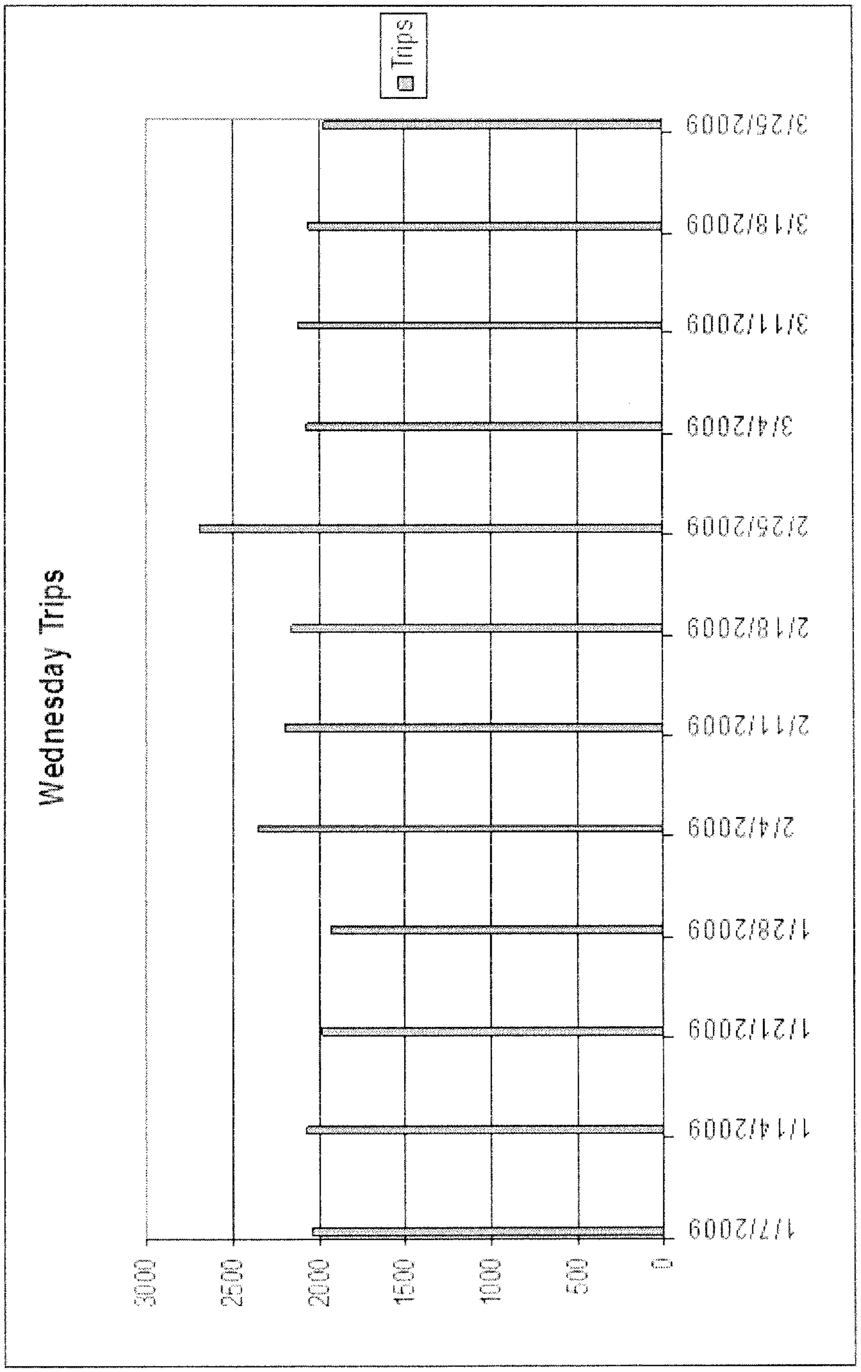
FIG. 4 is a chart of total trips for each Wednesday in a date range being analyzed.

FIG. 4 shows a chart of the number of trips for a set of past days that match the day type of a day for which service is being planned in an exemplary scenario. In this exemplary scenario, paratransit service is being planned for a Wednesday occurring in the first quarter of 2010, making it desirable to model demand and service on a past day from the first three months of the previous calendar year. The analysis date range specified is the first three months of 2009 and all weekdays are not grouped together. Further, the target demand level specified is to meet all demand 90% of the time. As a result, the set of past days includes all past days of the same day type (i.e., Wednesdays) in the first three months of 2009.

Returning back to FIG. 3, the demand analysis application allows the user to identify and select a particular past day from the set of past days identified at 111 whose demand metrics best match the specified target demand level (112). The demand analysis application totals the passenger pick-up and drop-off events for each past day in the set and divides the total by two to determine the total trip count. In addition, based on the options selected on the options screen, the no-show trips, cancelled trips and unscheduled trips can be added to the total trip count. The past days are then sorted based on the total passenger pick-ups and drop-offs.

Once the adjusted total trip count for each past day in the set has been determined, the demand analysis application transmutes the target demand level for the day for which service is being scheduled into a number of projected trips to be satisfied for the day. For example, if the target demand level is stated as a percentage of days (x %) for which all projected demand is to be satisfied, the demand analysis application determines which of the past days being analyzed corresponds to the (1−x %)th percentile in terms of the adjusted total trip count.

FIG. 5 shows a table of the number of trips for the set of past days shown in FIG. 4, after ordering the past days by the magnitude of the number of trips.

Figure 6:
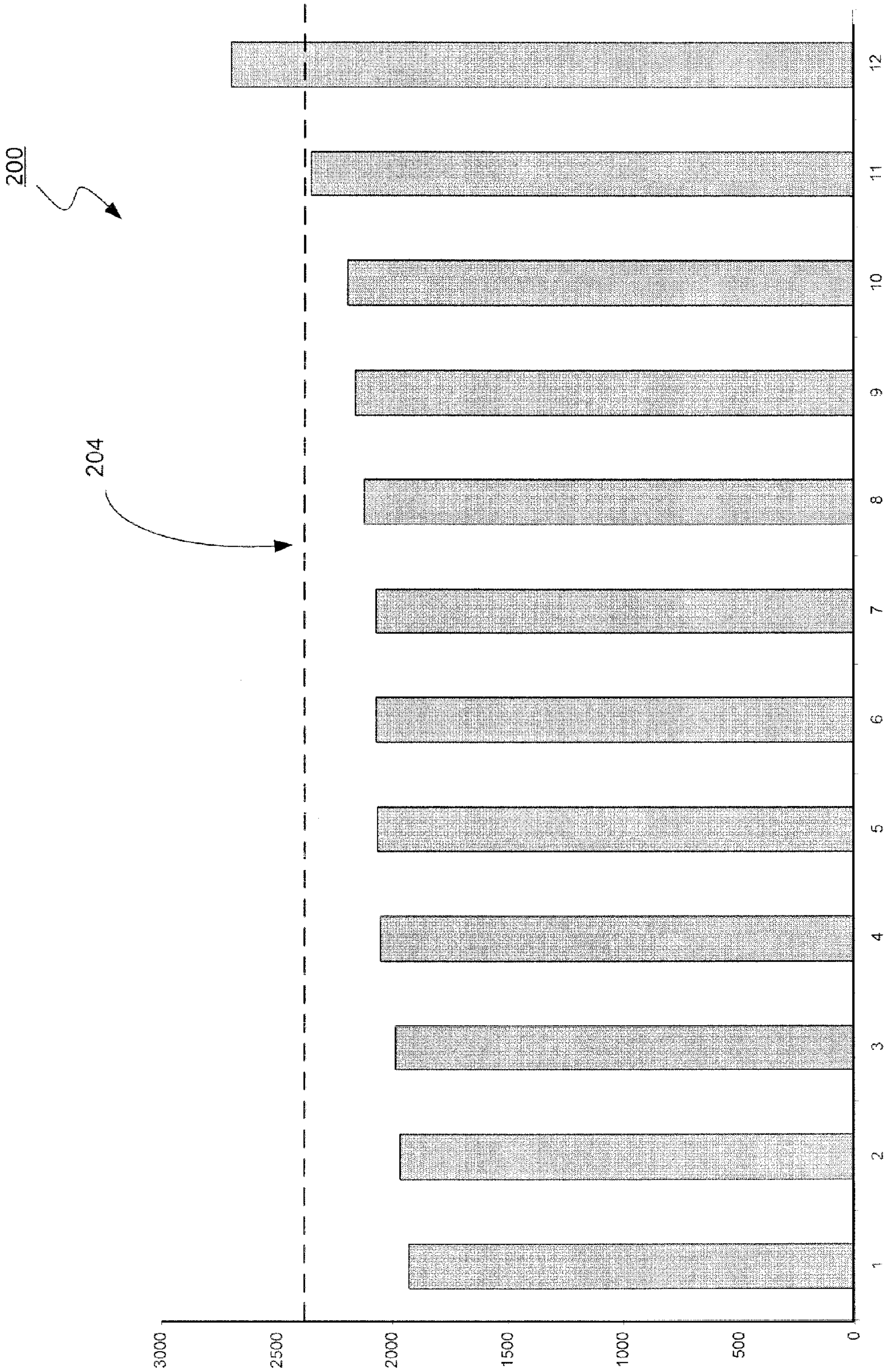
FIG. 6 is a chart of the number of trips for each of the past days shown in FIG. 4.

FIG. 6 shows a graphical representation 200 of the past days sorted by the total number of passenger trips for each past day as generated and presented by the demand analysis application. The demand analysis application maps the target demand level onto the graphical representation to enable a user to visualize which past days generally correspond with the target demand level. The user can then select a past day generally corresponding to the target demand level in the graphical representation.

Returning again to FIG. 3, it is determined if the distribution of demand metrics for the selected past day match the general demand pattern for the set of past days (113). In order to do so, the demand analysis application first determines the percent of total passenger pick-ups and drop-offs for each time interval during the past day selected by the user at 112. The times of both pick-ups and drop-offs are considered when computing trip counts by time interval. Passenger trips are attributed to a time interval based on the sum of all pick-ups and drop-offs, divided by two. This helps to properly recognize the commitments at the end of each run when all pick-ups have been completed but the run is still busy with drop-offs.

Figure 7:
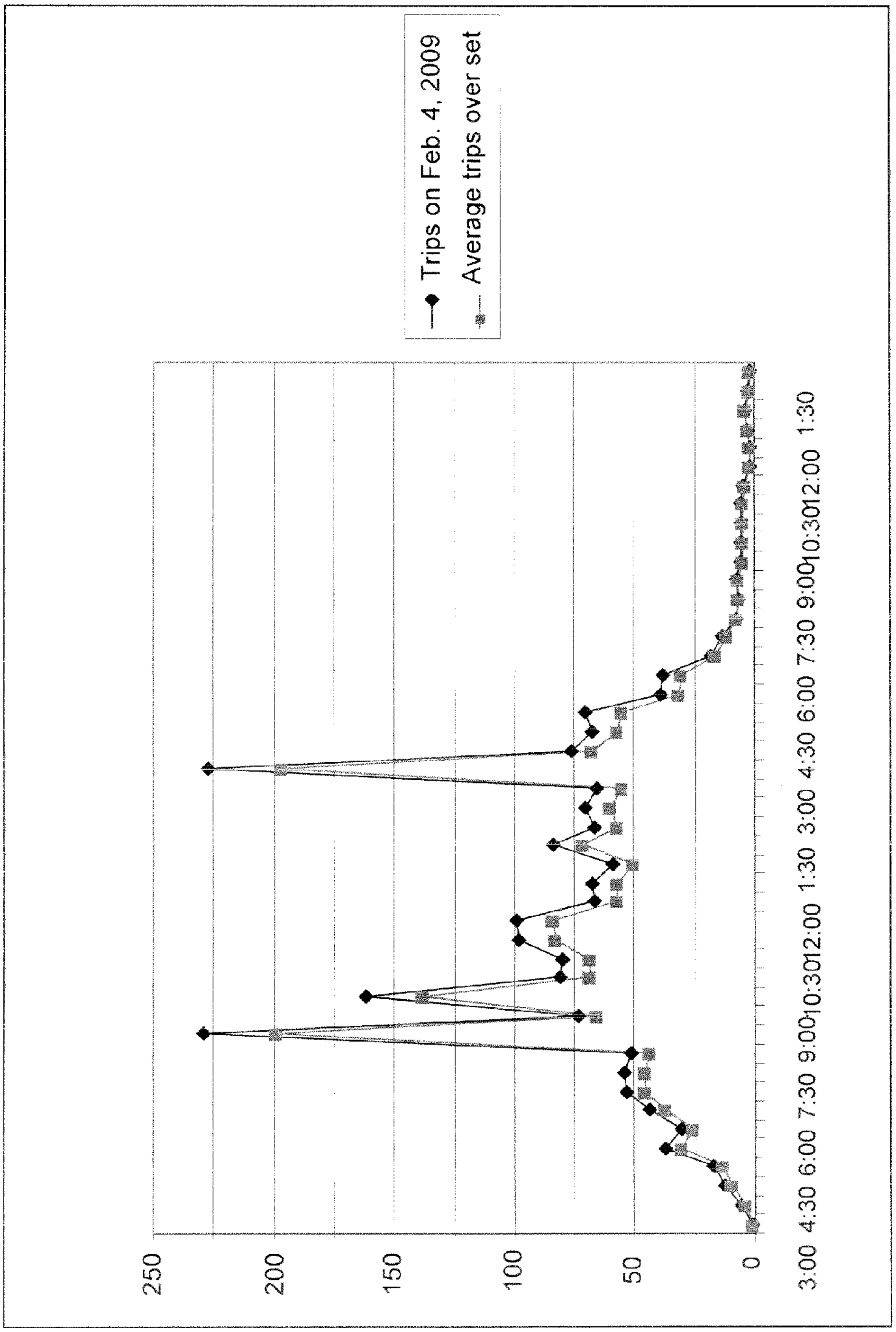
FIG. 7 shows the number of trips for each time interval for the selected past day and the average number of trips for each time interval for all past days in the date range analyzed, as shown in FIG. 4.

FIG. 7 illustrates the passenger trip counts by time interval for the selected past day versus the average trip count by time interval for the set of past days. As can be seen, there can be significant differences between the passenger trip counts for the selected past day and the average passenger trip counts over the set of past days for each time interval. At this point, however, the "pattern" or distribution of passenger trips throughout the day is of interest.

The demand analysis application graphically presents the distribution of passenger trips throughout the selected past day to a general demand pattern identified for the day type as represented by the set of past days. The general demand pattern for the day type being modeled is determined by averaging the adjusted trip counts for each time interval in the set of past days.

Figure 8:
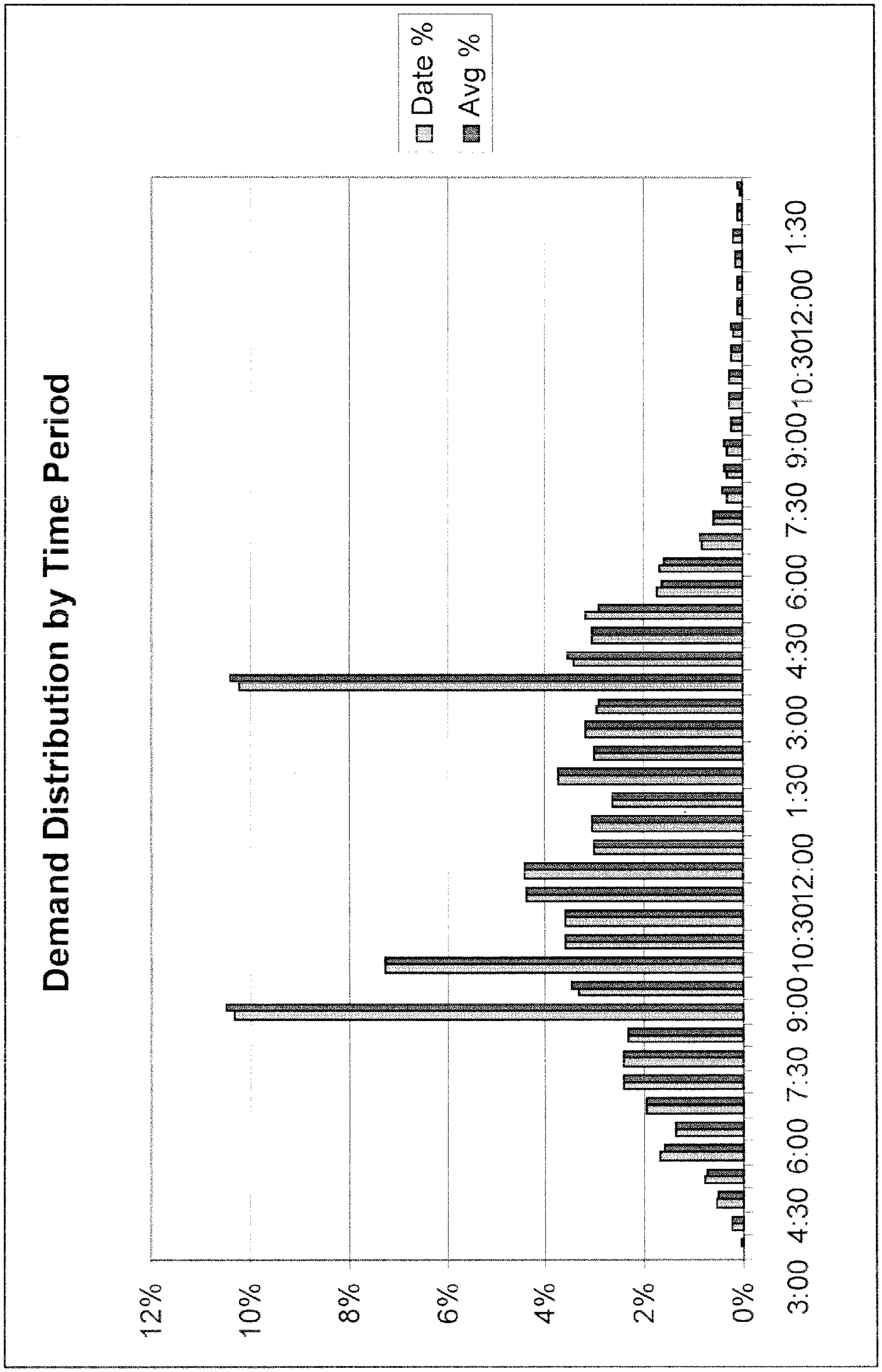
FIG. 8 shows the distribution of trips over the time intervals for the selected past day and the distribution of the average number of trips for each time interval for all past days in the date range analyzed, as shown in FIG. 6.

FIG. 8 shows a chart of the percent of the total number of trips occurring within each 30-minute time interval for the selected past day and the percent of the average number of trips for all past days in the set within each time interval. This chart is presented to the user upon selection of a past day from the set of past days presented to him via the graphical representation as shown in FIG. 6. As can be seen, in this case, the percents of the total number of trips occurring within each time interval for the selected past day are relatively close to those for the average past day in the set. While FIG. 7 showed absolute magnitudes the bars in FIG. 8 illustrate relative magnitudes. The user can configure the chart to alternatively be a line graph.

The demand analysis application enables the user to visually compare the percent of the total trip count for the selected past day for each time interval to those of the average number of trips for all past days in the set within each time interval. If the user is satisfied based on the overlay that the distribution of trips for the selected past day sufficiently matches the general demand pattern for the day type, then he can accept the selected past day as representative.

Returning again to FIG. 3, if the user rejects the selected past day, the selected past day is discarded and another particular past day is selected by the user (114). The user is presented with the sorted list of past days again together with the mapped target demand level to enable his selection of another past day for further analysis. After selecting another particular past day, the method returns to 113, at which the user determines if the demand pattern for the newly-selected past day selected at 114 matches the general demand pattern for the day type being modeled.

If, instead, the user determines that the distribution of trips for the selected past day matches the general demand pattern for the day type, selection of one of the set of past days upon which the service schedule will be modeled is complete. The demand analysis application can generate as output a table of expected demand, in number of trips, by time interval for the day for which service is being scheduled, and a graphical view of the results.

Next, the demand analysis application establishes an initial service schedule using the actual service provided on the selected past day (115). The demand analysis application assumes that the projected demand for the day for which service is being scheduled is equal to the adjusted demand metrics for the selected past day. The demand analysis application retrieves the service metrics (i.e., the number of vehicles for each time interval) from the historical paratransit data for that particular past day and uses them as an initial service schedule.

The demand analysis application then adjusts the initial service schedule for the service fit metrics for the selected past day (116). The demand analysis application looks at the service fit metrics to determine how to adjust the initial service schedule to better match the actual demand. As previously noted, the service fit metrics include slack and lateness metrics. The slack metrics provide a measure of how much drivers were idle, and the lateness metrics provide a measure of how often passenger pick-ups (and, in some cases, drop-offs) were late by more than a user-specified period of time, such as live minutes.

The adjustment for slack metrics is based on a formula that reduces the number of vehicles required in any given time period by a user-adjustable percent of the number of runs (or vehicles on the road) that are identified to meet or exceed the user-specified number of minutes of slack within the time interval in question. For each time interval, every run is evaluated to determine the amount of slack time. The slack time ignores chunks of slack that are smaller than a user-definable minimum slack time threshold.

For example, suppose that the time interval is 15 minutes, the slack threshold is also 15 minutes, and the applied percent is 20%. If the nominal vehicle requirement is 100 vehicles in a particular time interval, but 20 of those vehicles are slack for the entire 15 minute period, then the vehicle requirement will be reduced by 20% of 20 vehicles, making the adjusted vehicle requirement 100−(0.2×20)=96 vehicles.

The adjustment for lateness metrics is based on a formula that increases the number of vehicles required in any given time interval by a user-adjustable percent of the number of runs that are identified to have met or exceeded user-specifiable criteria for lateness within the time interval in question. In the current embodiment, the actual time of arrival is compared with the end of the pick-up window provided to the passenger for every client event (pick-up or drop-off) on even run. If the actual time of arrival is after the end of the pick-up window by more than a user-defined threshold, then the run is considered late in the relevant time interval. A run is also considered late if there is a passenger on board who was picked up late, even if the actual pick-up occurred in a prior time period. Persons skilled in the art will appreciate that alternative means for computing lateness can be alternatively employed. From this, the number of late runs can be determined for each time interval. The number of additional runs (i.e., vehicles) added to the service schedule (i.e. the target number of vehicles) is equal to the number of late runs multiplied by a user-defined late run factor, and rounding the product up to the nearest whole number.

For example, suppose that the late threshold is 15 minutes, and seven runs operated late by more than this amount in the selected date/time interval. If the late run factor is 0.5, then 0.5×7=3.5, rounded up to four. Thus, four additional runs are added to the particular time interval in the service schedule to compensate for the lateness metrics.

Once the service schedule is adjusted for the service fit metrics, the service schedule is further adjusted for the expected growth rate (117). In particular, the demand analysis application determines the period of time between the selected past day upon which service is being modeled and the day for which service is being scheduled, and applies the growth rate inputted by the user to the service schedule to accommodate for growth during this period.

Turning back to FIG. 2, once the target number of vehicles for each time interval for each day in the period for which service is being planned has been determined, the demand analysis application generates input data (120). The input data is an extensible markup language ("XML") file. The demand analysis application generates trip data for each vehicle required for each time interval. The trip data represents a mock trip, and includes the time at the start of the time interval, a point of departure, the time at the end of the time interval and a destination which is set equal to the point of departure. Thus, if the target number of vehicles for a time interval is 28, the input data is populated with 28 identical entries for mock trips commencing at the same time and ending at the same time, and departing from the same location as the destination. In fact, in this embodiment, only one location is ever used for the point of departure and the destination for any trip. In this manner, each of the mock trips is defined such that a vehicle performing one of the mock trips in one of the time intervals is able to perform any of the mock trips in an immediately subsequent one of the time intervals.

FIG. 9 illustrates exemplary input data for a week. As shown, each mock trip starts and ends in the same location, and multiple mock trips have the same characteristics for each time interval. Those skilled in the art will understand that the exact format of the input data may change to match the specifications of the fixed-route transit run-cutting application being used.

Upon generation of the input data XML file, the demand analysis application stores it in non-volatile storage 40 of the computer system 20, When the input data is ready, a run-cut is generated using the fixed-route transit run-cutting application (130). The XML file with the input data is identified by the user, either via entry of the path and filename for the input data or via its selection by browsing to the file. The information presented in the XML file is converted to a format that can be understood by the run-cutting application.

The fixed-route transit run-cutting application takes the input data generated by the demand analysis application (that is, the target number of vehicles required in service by time interval and day) and uses them to produce vehicle runs and driver shifts and rosters. In doing so, the fixed-route transit run-cutting application takes into consideration the following constraints.

The number of runs on the road at any time of day cannot exceed the maximum pullout capability of the available vehicle fleet. The operator may remove this limitation in order to understand when to add vehicles to the fleet.

The maximum number of runs that can be scheduled to pull out in any one time interval.

The operator can specify the maximum number of total service hours (pull-out to pull-in). This can pose an insoluble problem, given the demand. It is common practice, however, particularly among sites that have the ability to divert demand to taxis or other undedicated resources. The goal in such a case can be to satisfy as much demand as possible given the maximum available hours, thus minimizing the number/cost of passenger trips that must be diverted, as the cost of these diverted trips is generally picked up by the paratransit service providers.

The operator can specify various parameters that define different types of legal driver shifts. The different types of legal driver shifts form profiles. All runs are then constructed to conform to one of the profiles defined for a legal driver shift. This is expressed as a minimum driver shift length and a maximum driver shift length.

Driver shifts either qualify as a full time "straight" assignment of a single run or as a candidate to match two or more runs together according to rules that apply to full-time split shift rules. The operator can specify the maximum percent of runs that are too short for a straight shift and which therefore must be combined with other split type runs to form a daily driver shift.

The fixed-route transit run-cutting application obtains a number of inputs from the user, including the types of runs that the operator wishes to schedule. The user can define any number of distinct "legal" run types; that is, run types that the paratransit service provider wants to build to comply with law, agreements, etc. For each distinct legal ran type, the user can specify the minimum run length and the maximum run length.

Illustrated below is a legal run type table of four distinct run types defined by an operator. The first legal run type, labeled "Straight 10", is a straight run of minimum length 9 h 45 m and maximum length 10 h 15 m. The second legal run type, labeled "Straight 8", is a straight run of minimum length 7 h 30 m and maximum length 8 h 00 m. The third legal run type, labeled "Split 5", is a split run of five hours in length. The fourth legal run type, labeled "Split 4", is a split run of minimum length 3 h 45 m and maximum length 4 h 15 m. The designation of straight or split is used to indicate whether or not the run may be combined with another run to form a driver shift. The creation of a split driver shift (a driver shift consisting of two or more split runs) may be governed by rules limiting the amount of time between runs and/or the maximum elapsed time from the beginning of the first run to the end of the last run of the driver shift.

| Description | Type | Shortest | Longest |
|---|---|---|---|
| Straight 10 | Straight | 9 h 45 m | 10 h 15 m |
| Straight 8 | Straight | 7 h 30 m | 8 h 00 m |
| Split 5 | Split | 5 h 00 m | 5 h 00 m |
| Split 4 | Split | 3 h 45 m | 4 h 15 m |

Users can also specify the amount of time to assume as non-revenue from the pullout to the first available pick-up, as well as from the last drop-off to the pull-in. This is added to every driver shift.

The inputs obtained at this stage are:

the minimum percent of straight driver shifts (which is equal to the maximum percent of split driver shifts)

which split types can be combined; for example, can a piece of work be made up of two "Split 5" driver shifts?

the maximum spread time allowed, measured from the first run pull-in to the second run pull-out and/or measured from the first run pull-out to the second run pull-in the maximum number or percent of split driver shifts that can be created as part-time driver shifts, meaning they are not combined with any other driver shift to make a full-time driver piece of work.

These inputs are stored in a configuration file in storage.

If the proportion of straight driver shifts is below a minimum specified by the paratransit service provider, split driver shifts are coupled together to form straight driver shifts until the minimum proportion is satisfied. The fixed-route transit run-cutting application analyzes pairs of driver shifts identified as being candidates for combining to form straight driver shifts according to the rules specified by the paratransit service provider for spread times. In particular, the original driver shifts before time was appended by the fixed-route transit run-cutting application are looked at. If two driver shifts qualify for such analysis, the blocking and run-cutting tool considers combining the driver shifts by appending additional time between the driver shifts.

In order to meet the constraints of a legal driver shift as specified by the operator, in some cases, additional time is appended onto driver shifts. For example, if a driver shift length of 6 h 30 m is calculated to meet demand, it can be desirable to append one hour on an end of the driver shift to make it a legal straight eight hour driver shift as per the above table.

In addition, user inputs permit a time allowance for a formal lunch break policy, if so desired.

Once the minimum proportion of straight driver shifts is met, the coupling ceases and the coupled driver shifts generated by the fixed-route transit run-cutting application plus the straight and split driver shifts generated by the fixed-route transit run-cutting application, including the appended additional time, form a basis for the run-cut. The run-cut represents the proposed final service schedule.

The outputs of the fixed-route transit run-cutting application are as follows:

A tabular representation of runs, including start time and end time.

A graphical representation of runs, including start time and end time.

A tabular representation of driver shifts, including start time and end time.

A graphical representation of driver shifts, including start time and end time. Each driver shift is coded to show what type of driver shift it is. Additionally, the appended time may be colored differently to distinguish it from the other driver shift time.

A tabular summary of the solution, showing the number of driver shifts of each defined type.

A series of metrics that represent the efficiency of the solution. This includes the pay-to-platform ratio, assuming a user-defined deadhead on the pull-out and pull-in of each run.

Once the driver shifts are completed, they are then assembled into biddable/assignable pieces of work by the fixed-route transit run-cutting application (136). Using the above parameters and the generated runs and driver shifts, the fixed-route transit run-cutting application uses logic to produce a paratransit service schedule including driver shifts. In traditional scenarios, each piece of work consists of either a single straight driver shift or two split driver shifts. The information for each driver shift includes the start time and end time for each day of the week. The roster consists of recommended biddable pieces of work.

Once the runs and driver shifts are assembled and rostered, output is generated. In particular, the fixed-route transit run-cutting application stores the service schedule in non-volatile storage 40 of the computer system 20. The user interface permits review of the run-cut results and approval thereof.

Once the run-cut is approved by the user, the run-cut is outputted (140). In this embodiment, the fixed-route transit run-cutting application permits interfacing directly with a commercial paratransit scheduling system to communicate the resulting runs for the purpose of validating the results by rescheduling the trips against the revised run profile. In addition, the fixed-route transit run-cutting application also generates a set of runs in both graphical and tabular format that can be used for manually establishing runs in another commercial paratransit scheduling system that does not support the service, if so desired.

Once output is generated, the method 100 ends.

The mock trip construct succeeds because each mock trip is defined to start at the beginning of a standard time interval, end at the end of that time interval, and both begin and end at the depot location. This allows the transit run-cutting application to link these mock trips together as if they were true transit trips. In particular, the use of a common location for the beginning and end of all mock trips satisfies the geographic proximity requirements of the connection. In reality, on any given day, the vehicle might be anywhere in the service area at the time interval boundary, but that is not known at the time of the run-cut and can be treated as an irrelevancy by assuming a universally-common connection point for all vehicles operating out of the same depot.

While, in the above-described embodiment, mock trips are defined using the same location as the point of departure and the destination in the above-described embodiment, those skilled in the art will understand that a multiple depot solution is also possible, wherein the run-cutting application solves a problem in which a specified number of mock trips for each of two or more depots are required to be run-cut and the solution generated must observe the depot-specific constraints. In this scenario, each run must be constituted from mock trips ail belonging to the appropriate depot from which the run originates and terminates.

While the invention has been described with specificity to a certain approach, those of skill in the art will appreciate that variations to the approach described above can be used without departing from the spirit of the invention. For example, various other approaches can be taken to determine a target number of paratransit vehicles for each time interval. The demand for paratransit service to be satisfied can be projected in any number of ways that will occur to those skilled in the art. Further, the determination of the target number of transit vehicles for each time interval can be determined in various manners.

The functionality of the demand analysis application can be provided by two or more systems/applications. For example, one application or system can analyze historical demand and project a demand distribution for a period for which paratransit service is being scheduled, a second application or system can map a target demand level onto the projected demand distribution to derive a demand level to be satisfied, and a third application or system can determine the target number of vehicles required to address the demand level to be satisfied.

The determination of the target number of vehicles by time interval can be performed manually, if so desired.

In a particular embodiment, the time intervals can be of a standard length between 15 minutes and one hour.

Computer-executable instructions for determining the target number of paratransit vehicles by time interval and generating a target number of trips corresponding to the target number of paratransit vehicles for each time interval, wherein each of the trips is defined such that a vehicle performing one of the trips in one of the time intervals is able to perform any of the trips in an immediately subsequent one of the time intervals, on a computer system could be provided separately from the computer system, for example, on a computer-readable medium (such as, for example, an optical disk, a hard disk, a USB drive or a media card) or by making them available for downloading over a communications network, such as the Internet.

While the term "application" is used in the description above, those skilled in the art will appreciate that any combination of software, firmware and/or hardware that provides the required functionality fall within the scope of the term. Further, one or more of these tools can be split apart or merged.

While the computer system is shown as a single physical computer, it will be appreciated that the computer system can include two or more physical computers in communication with each other. Accordingly, while the embodiment shows the various components of the stateful data sharing service residing on the same physical computer, those skilled in the art will appreciate that the components can reside on separate physical computers. Further, any or all of the components of the stateful data sharing service can reside on a separate physical computer from the software systems.

The fixed-route transit run-cutting application may only generate vehicle runs and driver shifts but may not generate rosters.

The input data can be in any one of a number of various alternative formats that will occur to those skilled in the art. For example, the input data can be provided in two or more separate files or database entries. Alternatively, the input data can be provided as a network communication. Another exemplary alternative for the input data is the representation of multiple trips via a single trip entry.

Where a party analyzes demand for multiple locations or entities, trips can be created with a point of departure/destination that is distinct for each location or entity. This enables the party to distinguish between the various locations/entities.

The above-described embodiments are intended to be examples of the present invention and alterations and modifications may be effected thereto, by those of skill in the art, without departing from the scope of the invention that is defined solely by the claims appended hereto.

What is claimed is:

1. A computer-implemented method for paratransit run-cutting, comprising:

determining by a processor a target number of paratransit vehicles for each of a set of time intervals;

generating by said processor, for each of said time intervals, a target number of mock trips corresponding to said target number of paratransit vehicles, each of said mock trips being defined such that a vehicle performing one of said mock trips in one of said time intervals is able to perform any of said mock trips in an immediately subsequent one of said time intervals;

entering said target number of mock trips for each of said time intervals into a fixed-route transit run-cutting application; and creating by said processor paratransit runs using a run-cut generated by said fixed-route transit run-cutting application.

2. The method of claim 1, wherein said time intervals are all of a standard length between 15 minutes and one hour.

3. The method of claim 1, wherein said mock trips start at the same location.

4. The method of claim 1, wherein said mock trips end at the same location.

5. The method of claim 1, wherein said mock trips start and end at the same location.

6. A system for paratransit run-cutting, comprising:

computer-readable storage;

input data stored in said storage, said input data comprising a target number of mock trips for each of a set of time intervals, said target number of mock trips representing a target number of paratransit vehicles for each of said time intervals, each of said mock trips being defined such that a vehicle performing one of said mock trips in one of said time intervals is able to perform any of said mock trips in an immediately subsequent one of said time intervals; and a fixed-route transit run-cutting application executed by a processor based on instructions stored in said computer-readable storage, said fixed-route transit run-cutting application being operable, when executed, to receive said input data stored in said storage and generate a run-cut corresponding to said input data.

7. The system of claim 6, wherein said time intervals are all of a standard length between 15 minutes and one hour.

8. The system of claim 6, wherein said mock trips start at the same location.

9. The system of claim 6, wherein said mock trips end at the same location.

10. The system of claim 6, wherein said mock trips start and end at the same location.

11. A computer-implemented method for run-cutting, comprising:

receiving by a processor input data comprising a target number of mock trips for each of a set of time intervals, said target number of mock trips representing a target number of paratransit vehicles for each of said time intervals, each of said mock trips being defined such that a vehicle performing one of said mock trips in one of said time intervals is able to perform any of said mock trips in an immediately subsequent one of said time intervals;

executing by said processor a fixed-route transit run-cutting application using said input data to generate a run-cut; and outputting said run-cut.

12. The method of claim 11, wherein said time intervals are all of a standard length between 15 minutes and one hour.

13. The method of claim 11, wherein said mock trips start at the same location.

14. The method of claim 11, wherein said mock trips end at the same location.

15. The method of claim 11, wherein said mock trips start and end at the same location.

16. The method of claim 11, wherein said input data is stored in a file stored in storage.

17. The method of claim 11, wherein said input data is received via network communication.

18. A system for run-cutting, comprising:

input data stored in computer-readable storage of a computer system, said input data comprising a target number of mock trips for each of a set of time intervals, said target number of mock trips representing a target number of paratransit vehicles for each of said time intervals, each of said mock trips being defined such that a vehicle performing one of said mock trips in one of said time intervals is able to perform any of said mock trips in an immediately subsequent one of said time intervals, said input data formatted for use with a fixed-route transit run-cutting application for generating a run-cut.

19. The system of claim 18, wherein said time intervals are all of a standard length between 15 minutes and one hour.

20. The system of claim 18, wherein said mock trips start at the same location.

21. The system of claim 18, wherein said mock trips end at the same location.

22. The system of claim 18, wherein said mock trips start and end at the same location.

* * * * *